T. M. BRINTNALL
Improvement in Wheel-Harrows.

No. 130,839.  Patented Aug. 27, 1872.

Witnesses.  Inventor.

2 Sheets--Sheet 2.

T. M. BRINTNALL
Improvement in Wheel-Harrows.

No. 130,839. Patented Aug. 27, 1872.

Witnesses.
H. J. Abbut
Harry Coleman

Inventor.
Thomas M. Brintnall
Willis N. Liggett
Attorney

UNITED STATES PATENT OFFICE.

THOMAS M. BRINTNALL, OF MEDINA, OHIO.

IMPROVEMENT IN WHEEL-HARROWS.

Specification forming part of Letters Patent No. 130,839, dated August 27, 1872.

SPECIFICATION.

Be it known that I, THOS. M. BRINTNALL, of Medina, in the county of Medina and State of Ohio, have invented certain new and useful Improvements in Wheel-Harrows; and I do hereby declare that the following is a full, clear, and exact description thereof, that will enable others skilled in the art to which it appertains to make and use the same, reference being had to the accompanying drawing and to the letters of reference marked thereon which form a part of this specification.

The nature of my invention consists in attaching one or more harrows to the frame in such a manner that a cam, secured to the axle, in revolving shall cause the harrows to have a reciprocating movement at right angles to the line of progress, as will hereafter be more fully set forth.

Figure 1:
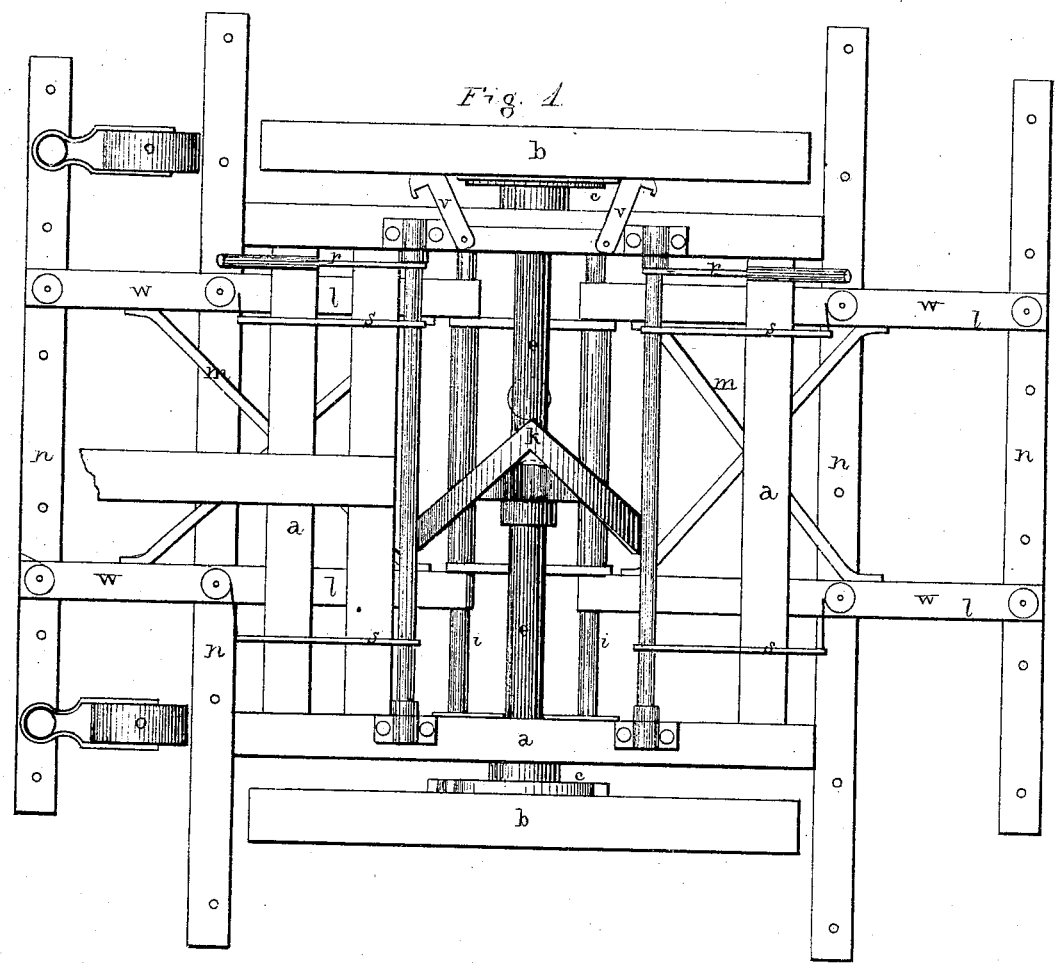
Figure 2:
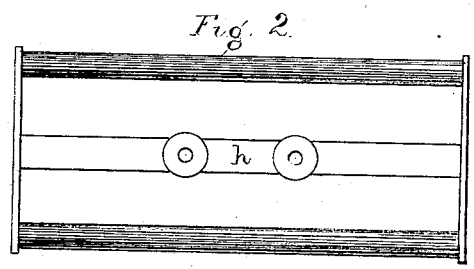
Figure 3:
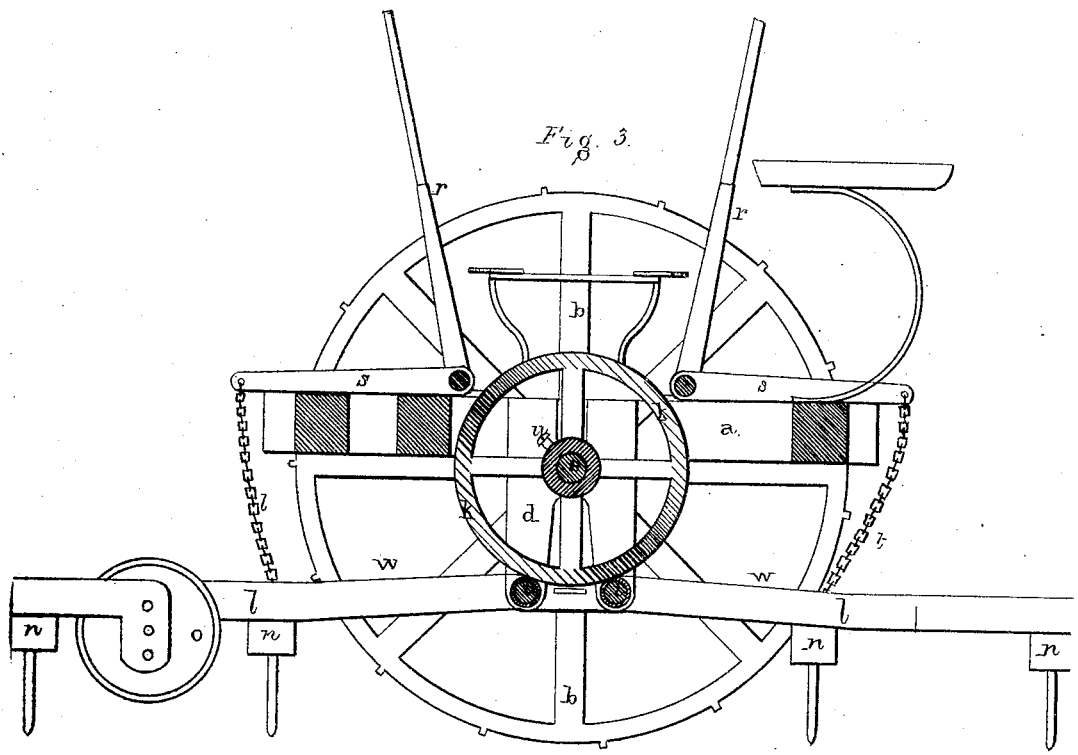

Figure 1 is a plan view of my invention, the driver's seat being removed. Fig. 2 is a similar view of the reciprocating frame. Fig. 3 is a section view of the harrow.

$a$ represents a common rectangular frame, supported by the two driving-wheels $b$, which are provided with projections upon their peripheries, so as to make them take hold of the ground. To the inside of each of these wheels is secured a common spring-clutch, $c$, which turns the axle upon a forward movement of the machine, but in moving backward they slip over the ratchets and allow it to remain stationary. Extending downward from each side of the frame is a hanger, $d$, which serves as a bearing for the axle $e$ and the two supporting-rods $i$, upon which the reciprocating frame $h$ slides. This frame consists of two sleeves which fit over the rods $i$, and a bar to which two friction-rollers are secured, and which is made to slide back and forth across the frame by means of the cam $k$ secured to the axle $e$. Attached to the reciprocating frame are two harrows, $w$, one extending in front and the other to the rear of the wheels, so that when the frame $h$ moves to and fro the motion is communicated to the harrows, giving them a movement at right angles to the line of progress. This back-and-forth motion at the same time that they are moving forward causes them to cultivate and pulverize the soil far more thoroughly and effectually than can be done by a forward movement alone. These harrows consist of the two beams $l$ braced by the cross-ties $m$ and two or more cross-pieces, $n$, of any suitable length, to which the harrow-teeth are secured. To the front harrow are secured two caster-wheels, $o$, which prevent the harrow from throwing back, and cause it to rise over any elevation in the ground. The bearings of the wheels have a number of holes in them, so that the depth at which the wheels will allow the harrow to sink can be regulated at will. At each end of the frame there is secured a lever, $r$, provided with arms $s$ and chains or cords $t$, for the purpose of raising the harrows from the ground when moving from place to place; or when only one is wanted for use the length of the chains or cords can be increased or decreased, according as it is desired to cultivate deeper or shallower. The hooks or catches $v$ serve to hold the levers in such a position as to elevate the harrows entirely free from the ground.

When it is desired to have the harrows move straight forward only, without the reciprocating side motion, the set-screw $u$ which binds the cam $k$ to the axle is loosened and the axle then turns freely without the cam, allowing the harrows to be drawn forward in the usual manner.

Having thus described my invention, what I claim as new, and desire to secure by Letters Patent, is—

1. The cam $k$ provided with the set-screw $u$, in combination with the axle $e$, when used in the manner and for the purpose set forth.

2. In combination with the cam $k$, the reciprocating frame $h$, rods $i$, and harrow $w$, or their equivalents, substantially as set forth.

3. The combination of the frame, wheels, and axle, cam, and reciprocating frame and harrow, when all are arranged as set forth.

In testimony that I claim the foregoing I have hereunto set my hand this 29th day of July, 1872.

THOMAS M. BRINTNALL.

Witnesses:
  H. J. WALKER,
  G. A. L. BOULT.